United States Patent
Pirillo

(10) Patent No.: US 6,990,464 B1
(45) Date of Patent: Jan. 24, 2006

(54) APPARATUS, SYSTEM AND METHOD FOR ELECTRONIC BOOK DISTRIBUTION

(75) Inventor: Paul Matthew Pirillo, Lawrenceville, GA (US)

(73) Assignee: NCR Corporation, Dayton, OH (US)

( * ) Notice: Subject to any disclaimer, the term of this patent is extended or adjusted under 35 U.S.C. 154(b) by 0 days.

(21) Appl. No.: 09/481,196

(22) Filed: Jan. 11, 2000

(51) Int. Cl.
*G06F 17/60* (2006.01)

(52) U.S. Cl. ..................................................... 705/26
(58) Field of Classification Search .................. 705/26, 705/14
See application file for complete search history.

(56) References Cited

U.S. PATENT DOCUMENTS

| | | | |
|---|---|---|---|
| 4,855,725 A | 8/1989 | Fernandez | 340/706 |
| 4,884,974 A | 12/1989 | DeSmet | 434/317 |
| 5,267,171 A | 11/1993 | Suzuki et al. | 364/479 |
| 5,339,091 A | 8/1994 | Yamazaki et al. | 345/104 |
| 5,396,417 A | 3/1995 | Burks et al. | 364/401 |
| 5,465,213 A | 11/1995 | Ross | 364/468 |
| 5,475,399 A | 12/1995 | Borsuk | 345/130 |
| 5,524,201 A | 6/1996 | Shwarts et al. | 395/161 |
| 5,623,690 A | 4/1997 | Palmer et al. | 395/806 |
| 5,717,595 A | 2/1998 | Cherrington et al. | 364/464.1 |
| 5,749,735 A | 5/1998 | Redford et al. | 434/307 R |
| 5,754,850 A | 5/1998 | Janssen | 395/615 |
| 5,761,485 A * | 6/1998 | Munyan | 345/839 |
| 5,802,516 A * | 9/1998 | Shwarts et al. | 707/6 |
| 5,806,045 A | 9/1998 | Biorge et al. | 705/14 |
| 5,847,698 A * | 12/1998 | Reavey et al. | 345/173 |
| 5,956,034 A * | 9/1999 | Sachs et al. | 345/776 |
| 5,956,048 A * | 9/1999 | Gaston | 345/530 |
| 6,128,605 A * | 10/2000 | Saito et al. | 705/57 |
| 6,129,274 A * | 10/2000 | Suzuki | 235/381 |
| 6,295,482 B1 * | 9/2001 | Tognazzini | 700/233 |
| 6,313,828 B1 * | 11/2001 | Chombo | 345/169 |
| 6,327,573 B1 * | 12/2001 | Walker et al. | 705/14 |
| 6,335,678 B1 * | 1/2002 | Heutschi | 340/286.02 |
| 6,438,233 B1 * | 8/2002 | Yoshimune et al. | 380/241 |

FOREIGN PATENT DOCUMENTS

WO     WO 99/12115     * 11/1999

OTHER PUBLICATIONS

"The virtual record co" (McManus, Sean. Jul. 10, 1999. Melody Maker).*
"All About eBooks" (Jan. 5, 2000. African American Literature Book Club. www.aalbc.com/writers/ebooks/All-aboutebooks.hm).*
"Tesco to use 'class' system for customer discounts" (Apr. 7, 1999. Cope, Nigel. The Independent).*
"Allair JRun Chosen to Power In-Store Information Kiosks for Home Depot" Nov. 8, 1999. PR Newswire.*

* cited by examiner

Primary Examiner—Jeffrey A. Smith
Assistant Examiner—Matthew S Gart
(74) Attorney, Agent, or Firm—Priest & Goldstein PLLC

(57) ABSTRACT

A system for electronic distribution of books and other media. The system includes a number of self-service stations from which a customer can select and order items and download the ordered item to a portable reader a or smart card. The system may include cryptoprocessing capabilities in order to prevent illicit duplication and distribution of items. The self-service stations are connected to a network of servers which provide access to information and capabilities, such as access to available titles which may be stored in a remote location, the ability to provide audio and video conferencing for customer assistance or as a special feature, such as a conference with an author, or access to customer account information. The system may collect and store customer information in order to provide the customer with an enhanced shopping experience, for example by collecting and analyzing purchase information in order to identify customer areas of interest and suggest purchases likely to interest the customer.

17 Claims, 10 Drawing Sheets

HELLO MR. JONES
SEARCH FOR TITLES

PLEASE FILL AS MANY FIELDS AS DESIRED

- AUTHOR _____ ---702A
- TITLE _____ ---702B
- SUBJECT _____ ---702C
- KEYWORD _____ ---702D

SUBMIT SEARCH

700

APPARATUS, SYSTEM AND METHOD FOR ELECTRONIC BOOK DISTRIBUTION

FIELD OF THE INVENTION

The present invention relates generally to electronic distribution of information. More particularly, the invention relates to methods and apparatus for sale and distribution of electronic books and other copyrighted information.

BACKGROUND OF THE INVENTION

Electronic distribution of information has gained greatly in importance with the proliferation of personal computers, and has undergone a tremendous upsurge in popularity and importance as the Internet has become more widely available and more popular. With the widespread use of the Internet, it has become possible to distribute large, coherent units of information, such as books, by electronic means. Various sources exist which make books available for download over ordinary Internet connections such as dialup connections. Downloading a book in this manner is relatively slow if downloading is performed through a dialup connection. Books downloaded in this manner are inconvenient to use, because they are typically readable only through the use of a computer. It is possible to print a downloaded book using a computer printer, but this is slow and expensive for large volumes of printing. Moreover, access to different parts of a work when viewed on a computer is provided by searching, or by scrolling back and forth through the work. The quick access provided by simply opening a paper book and thumbing through its pages is not available in a downloaded book read on a computer screen.

Because of these limitations, it is unlikely that a consumer would pay an amount near the full retail price for a downloaded book having these limitations, and the most widespread distribution of electronic books is performed by philanthropic enterprises which distribute books which are in the public domain, or books for which free licenses for electronic distribution can be obtained.

Recently, dedicated electronic book readers have been introduced into the market. The typical electronic book reader is a handheld digital device having an LCD panel and enough memory and processing capability to store several books and retrieve and display a book or portion of a book for reading. This dedicated approach increases the convenience of reading electronic books, and makes it more likely that they will be widely accepted in the marketplace. In addition, a portable electronic book reader containing a number of stored books weighs significantly less than the same number of paper books. This makes an electronic book reader a particularly attractive alternative to the actual paper books in situations such as air travel. A traveler might well be willing to carry an electronic book reader containing a collection of books which would be too heavy to carry if the collection consisted of conventional paper books.

A widespread and convenient distribution system would greatly increase customer acceptance of electronic books. Consumer acceptance will be enhanced if a system can be provided in a place where a customer is likely to frequently go, such as a supermarket, or where having such a system readily available would increase the likelihood and convenience of impulse purchases, such as an airport gift shop or hotel lobby. Acceptance will also be enhanced if the system allows easy access to a wide variety of titles in a single location, with provisions to allow browsing or searching of titles, or other means of finding titles matching customer interests. Acceptance would also be enhanced if the system could be operated directly by the customer. A system which could be efficiently and conveniently operated by a customer would avoid the need for customers to wait for assistance from a retailer employee. A customer operated system would also allow distribution in locations where it was costly or inconvenient to offer in-person employee assistance, and would thus allow for a wider variety of placement locations. Customers could also be served on a round-the-clock basis.

At present, a further obstacle to widespread distribution of electronic books is the problem of piracy. Piracy is not a problem with paper books, as the cost of illicitly duplicating a paper book is typically greater than the cost of purchasing a new copy. With electronic media, however, duplication can be both simple and inexpensive. In the absence of sufficient safeguards, a customer could pay for and download a single copy of a book, and could then distribute illicit copies. Any distribution system for electronic books must include safeguards or other aspects to prevent piracy, or the system cannot be commercially viable.

SUMMARY OF THE INVENTION

The present invention advantageously addresses such problems as those outlined above. One information distribution system according to the present invention includes a plurality of customer self-service stations adapted to transfer data to a portable reader or alternatively to a smart card. Each station includes a point of sale terminal for processing financial information, as well as information processing resources for retrieving electronic books and other information and transferring the information to portable readers or smart cards. The system provides servers for supporting the self-service stations by providing content for distribution, advertising and customer interface selections, as well as for the collection and processing of customer information collected from the self-service stations. Each station collects customer information based on customer selections made at the station or stored in a portable reader or smart card. The customer information is transferred to a central repository and processed for merchandising or customer incentive purposes. When a customer initiates a session at a self-service station, the station retrieves customer information from the central repository as well as from the reader or smart card, and uses the customer information to develop menus and offer suggestions. Customer inputs are used to make selections and conduct transactions, and to select from various help and conference options. The station may also offer incentives based on retrieved customer information and customer inputs.

A more complete understanding of the present invention, as well as further features and advantages of the invention, will be apparent from the following Detailed Description and the accompanying drawings.

DETAILED DESCRIPTION

Figure 1:
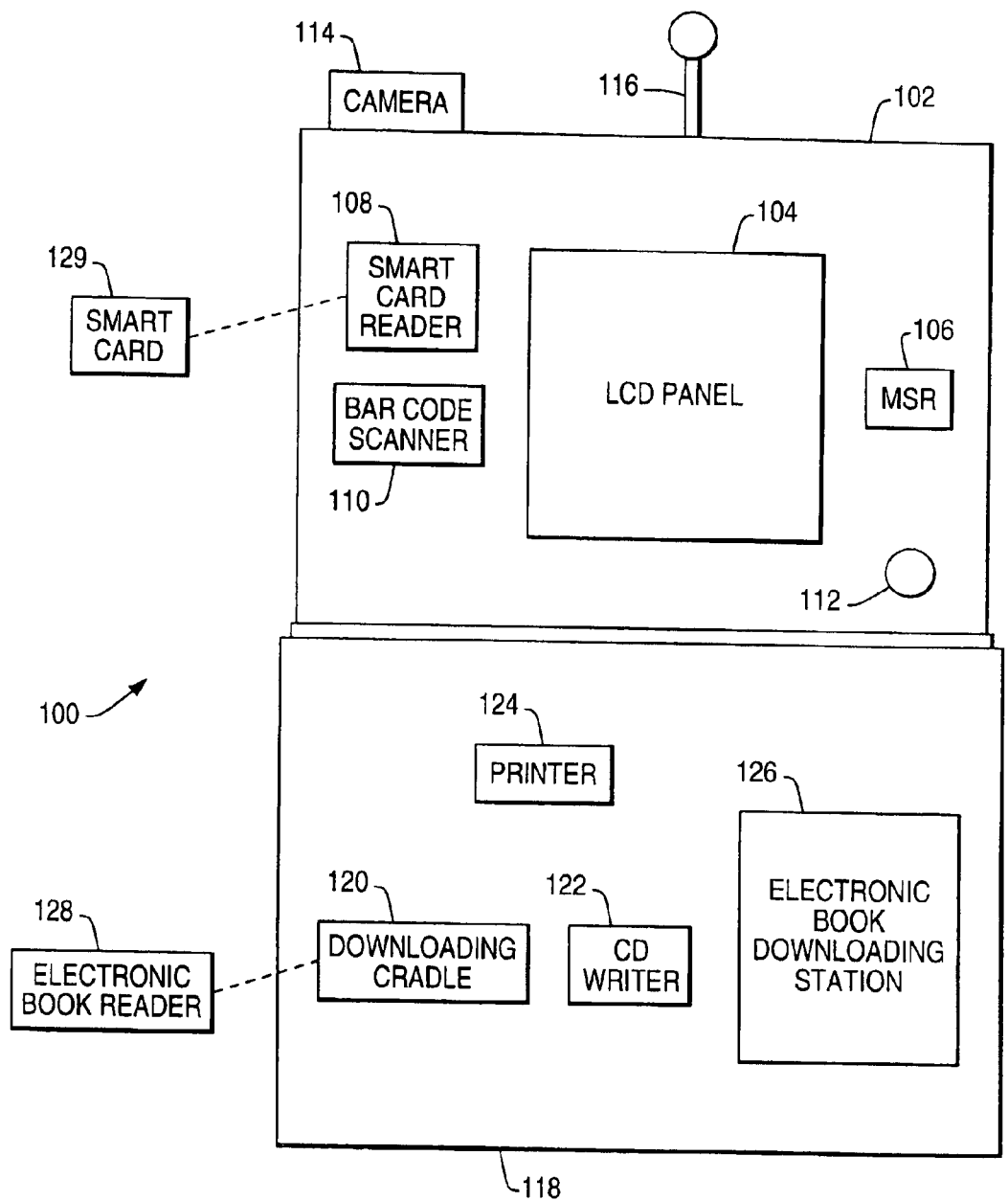
FIG. 1 illustrates a distribution station for sale and delivery books and other electronic information according to the present invention.

FIG. 1 illustrates a distribution station 100 according to the present invention, which may be suitably used by a customer to download of electronic books and other information. The station 100 is suitable for placement in any location which provides required power and data connections, and which provides an appropriate indoor environment with necessary shelter from the elements. The station is thus suitable for use in a typical book or music store, but may also be employed in locations not typically devoted to bookselling, such as a general merchandise store, supermarket, airport or gas station. The station 100 comprises a point of sale terminal 102, which includes an LCD panel 104 which is suitably a touch screen panel for information entry by the customer or other operator. The terminal 102 also includes a magnetic stripe reader 106, a smart card reader 108, a bar code scanner 110, a loudspeaker 112, and may also suitably include a camera 114 and a microphone 116 for allowing remote communication and assistance to a customer operating the station 100.

The terminal 102 may suitably be mounted on a pedestal 118, which also houses a downloading cradle 120 and a CD writer 122. The pedestal 118 also houses a printer 124 which may print transaction information, available title lists, or other information which the customer may wish to receive on paper. The pedestal 118 may contain advertising signs such as sign 126. Additionally or alternatively, the terminal 102 may be programmed to display advertising messages on the LCD panel 104 while not being operated by a customer.

In order to download a book, a customer places an electronic book reader 128 into the cradle 120. The terminal 102 is activated and presents a menu of choices to the customer through the LCD panel 104. The customer makes the necessary selections and tenders payment by passing or swiping a credit or debit card through the magnetic stripe reader 106. Upon proper selection and tender of payment, the station 100 retrieves the selected title and transfers it to the reader 128. The station 100 may include books stored locally on appropriate storage media, or may retrieve books from a remote server for transfer.

In order to prevent piracy, the station 100 preferably provides means to prevent recopying of downloaded books without authorization. One way to achieve this is through encryption of the downloaded data. This can be done with public key encryption. Each reader 128 can generate a key pair upon first use. Each time a book is downloaded to a reader 128, the reader can supply its public key to the station for encryption of the downloaded data. The data can then be encrypted in the station 100. The station 100 transmits the encrypted data to the reader 128. In order to convert the encrypted data into plaintext, the reader 128 decrypts the data using its own private key, which is associated with the public key provided to the station 100. In this way, a book can be provided to a reader such as the reader 128 in a secure way, without the customer being able to generate multiple illicit copies of the book to provide to other people.

The station 100 also provides an alternative way of transferring data. The customer can be provided with a smart card 129 for insertion in the reader 108. In addition to containing information about the customer, for example, customer preferences, the smart card 129 can be programmed with a key pair. When the smart card 129 is inserted into the smart card reader 108, the station 100 reads the public key. Then, when a customer has chosen a book for download and the download process is ready to begin, the station 100 encrypts the book using the public key read from the smart card. The station 100 transmits the encrypted data to the reader 128. Then, in order to read the book, the customer inserts the smart card into the reader 128. The reader 128 retrieves the private key from the smart card 129 and decrypts the data using the private key. If this arrangement is used, a reader such as the reader 128 can be designed to allow the transfer of a book to another reader, but the book cannot be read without the smart card 129. If a smart card has sufficient memory capacity, the book could simply be loaded directly onto the card, without a need to download the book directly to the reader 128. This would greatly enhance the user's convenience in downloading books, and would make purchasing much easier.

The station 100 is also capable of reading customer information from the reader 128 or the smart card 129. Information previously stored, either from direct customer entries or from analysis of customer reading and purchase habits, may be extracted from the reader 128 or the smart card 129 by the station 100. The station 100 either may store the customer information and may also relay it to a central repository. In either event, the customer information may be processed and used for merchandising or as part of a customer incentive program or other program designed to promote customer loyalty.

If media such as music or computer software is to be purchased, the station 100 may retrieve the appropriate data and use the CD writer 122 to create a CD. Financial information may be supplied by customer inputs at the terminal 102, and customer preference information may be taken from a smart card 129 or book reader 128 in the same way as with book purchases described above.

Figure 2:
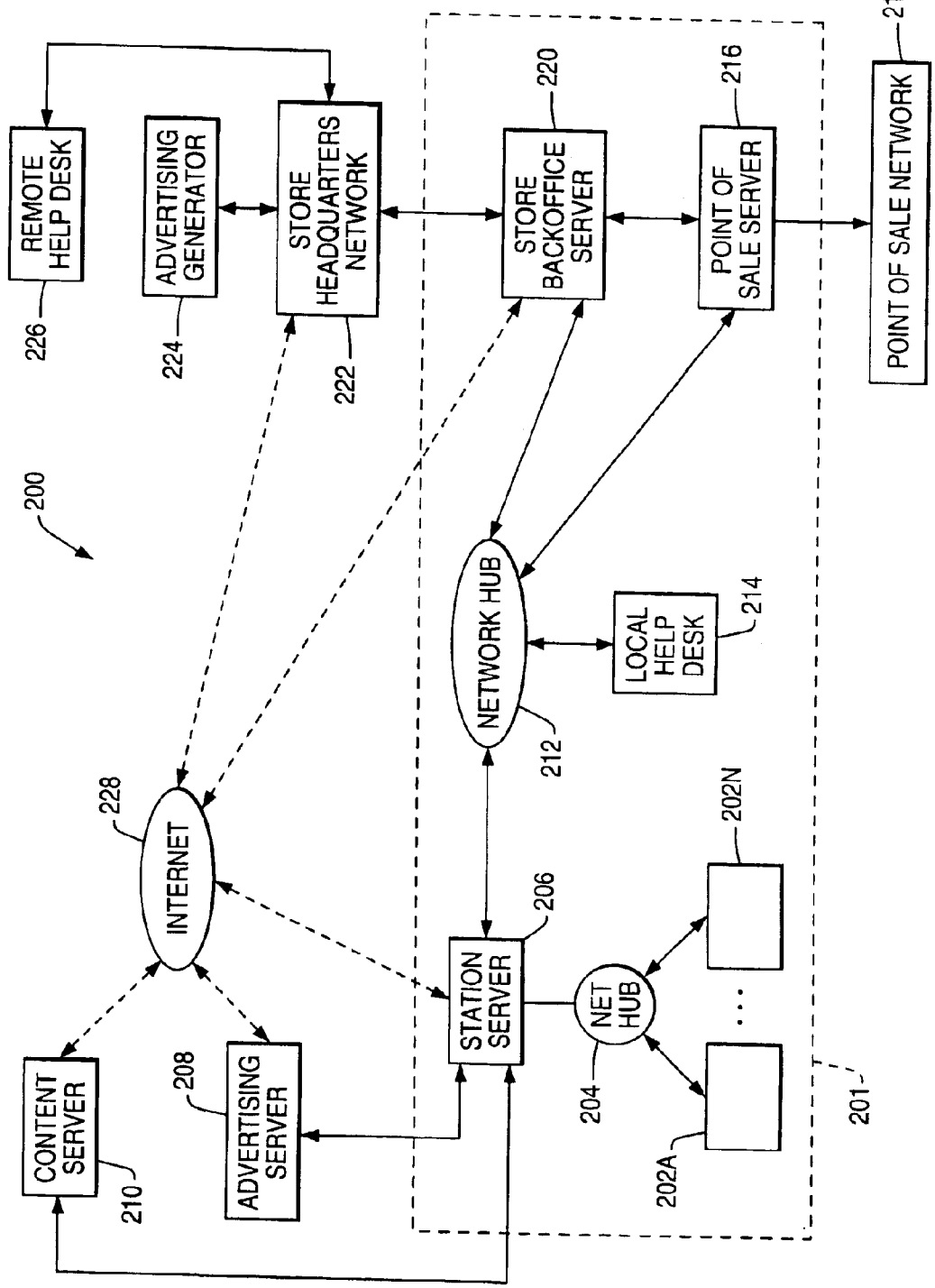
FIG. 2 illustrates a distribution system for the sale and delivery of electronic information according to the present invention.

FIG. 2 illustrates an electronic distribution system 200 for the distribution of electronic books and the receipt of marketing and service information. The system 200 includes one or more store systems such as the store system 201. The store system 201 comprises a plurality of customer self-service stations 202A–202N, similar to the station 100 of FIG. 1. The stations 202A–202N are connected to a first network hub 204, which is in turn connected to a self service station server or also known as a terminal support manager 206. The station server 206 provides a connecting point for providing services to stations in a single location such as a retail store. The self service station server 206 connects to an advertising server 208 and a bookstore content server or also known as a terminal data manager 210. The self service station server is also connected to a second network hub 212 which provides connection to a local help desk 214 and a point of sale server 216. The point of sale server 216 provides connection to a point of sale network 218. The second network hub 212 also provides connection to one or more store backoffice servers such as as store backoffice server 220. The backoffice server 220 provides a connection to a store headquarters network 222 which provides services to the store system 201 and other similar store systems. The store headquarters network 222 is connected to an advertising generator 224 and a remote help desk 226. The self-service station server 206, advertising server 208, bookstore content server, store backoffice server 220 and store headquarters network 222 are preferably connected to the Internet 228 to provide a convenient means for information transmission. Each of these components preferably possesses encryption capability for secure transmission over the Internet 228. The advertising generator 224 makes advertising content to each store system such as the store system 201. The advertising content may be displayed on each of the stations 202A–202N in response to predetermined choices. In addition, customer data and customer responses may be used to select advertising content to be displayed on a specific station. The local help desk 214 or remote help desk 226 may be connected to a station in response to a customer command to connect to the local help desk 214 or remote help desk 226. Additionally, the self service station server 206 may examine customer selections and make contact with the help desk in response to erroneous selections.

The distribution system 200 of FIG. 2 allows for analysis of the purchasing and usage habits of each customer, and therefore allows targeted marketing directed toward each customer. This can begin as soon as a customer connects a book reader to a station. The book reader possesses a user identification, which may be in the form of a public key as discussed above. When the customer inserts the book reader into the station, the station reads the user identification. Upon receiving the user identification, the station transmits the identification to the self service station server 206. The station server 206 retrieves customer data, either from local storage or from a remote location such as the point of sale server 216. The self service station server 206 then transmits the customer data to the station, and the station uses the customer data to construct and display a greeting menu adapted to the customer. The menu may include content suggestions generated from the customer's in-store purchase history, the customer's browsing and purchase history at the self-service station in the store, and patterns established by the customer's previous downloads. Alternatively, content suggestions may be based on an examination by the station of the current content of the reader. The station examines the content of the reader in order to accomplish this. As a further alternative, the menu may be constructed using a favorites list constructed by the customer, either through the self-service station or on the reader itself.

Functions which may be selected from the menu include content selection. If content selection is chosen, the terminal makes suggestions based on the customer information received as described above, and additionally allows searching and browsing for content. Additional menu items include viewing and editing of account information, audio and video conferencing with a sales representative or help desk staff, viewing of special promotions, or customer surveys. In addition, menu selections are provided for browsing or searching through available content, and selection and downloading of content.

Figure 3:
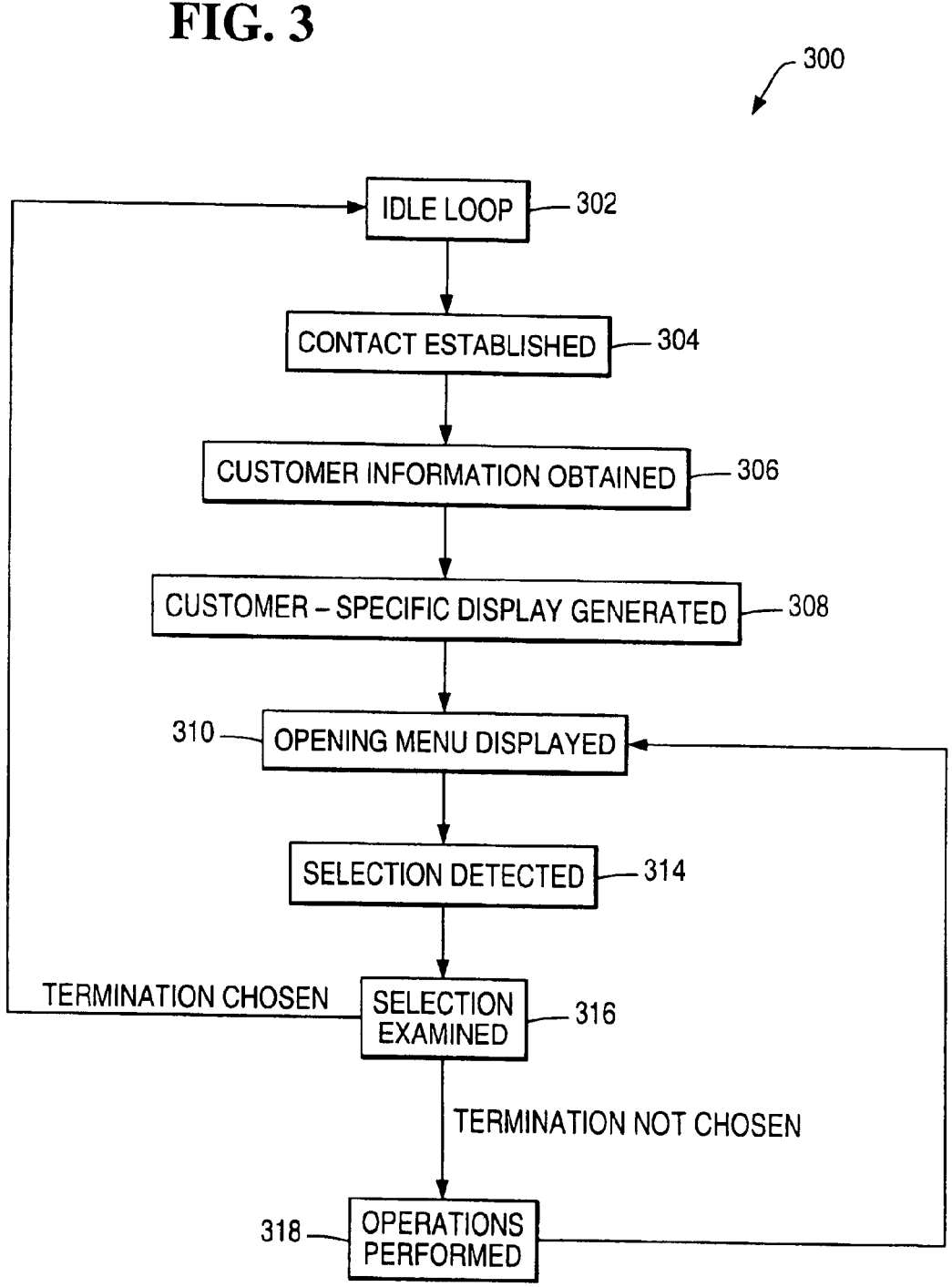
FIG. 3 illustrates a method of customer interface with an electronic distribution network according to the present invention.

FIG. 3 illustrates the steps of a method 300 of customer interface with a self-service terminal according to the present invention. At step 302, a self-service station engages in an idle loop. The self-service station may suitably be similar to the station 100 of FIG. 1. The idle loop comprises functions which are repeatedly performed until the loop is interrupted by a customer input. Idle functions may be operations designed to call attention to the station or to provide useful information, such as video and audio programs describing items available for downloading. At step 304, upon a customer's approach to the station and placement of a storage device within a suitable receptacle in the station, contact is established between the station and the customer. The storage device may be a portable reader, placed into a cradle, or a smart card, inserted into a suitable slot in the station. The establishment of contact interrupts the idle loop and the process proceeds to step 306. At step 306, the station obtains customer information from the contact device, uploading a portable reader identification or a smart card identification, along with any necessary keys, as well as customer preference information, such as a customer list stored within the device or the currently existing downloaded content in the device.

Next, at step 308, the station examines the customer information to determine customer preferences, and uses the customer preference determination to produce customer-specific information to be displayed in the opening menu. Customer-specific information may include the customer information gathered from the device, as well as customer buying habits stored in the station or obtained by the station from a central location. Next, at step 310, the customer-specific information is combined with general information to produce an opening menu for display. Next, at step 312, the opening menu is displayed. The opening menu preferably includes a greeting, available commands such as searching, browsing, viewing and editing account information, viewing promotions, and participating in surveys. The opening menu also displays customer-specific menu items based on the customer information, as well as general suggestions such as bestsellers, new titles, and staff recommendations. At step 314, customer selections from the menu are detected. Next, at step 316, the selection is examined to determine if the customer has directed termination of the session. If the customer has terminated the session, the process returns to step 302. If the customer has not terminated the session, the process proceeds to step 318 and operations are performed according to the selection made. The operations may include the generation of subsequent menus, searching or browsing, transfer of information such as the downloading of books, or other operations. The process then returns to step 310.

Figures 4, 7:
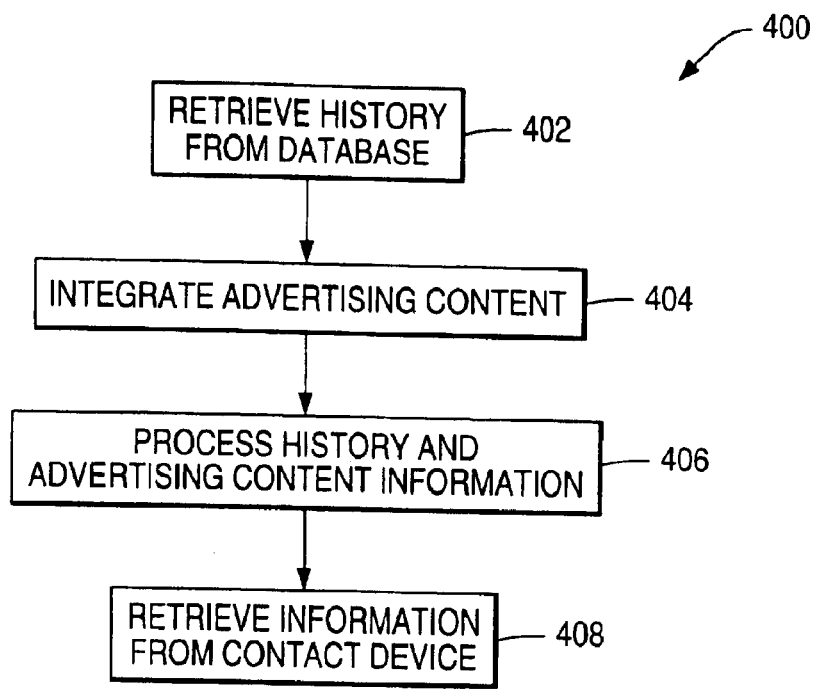
FIG. 4 illustrates additional steps of a method of customer interface with an electronic distribution network according to the present invention.
FIG. 7 illustrates a further menu displayed in response to a selection from the menu of FIG. 6.

FIG. 4 illustrates in greater detail a sequence of operations for carrying out step 308 of FIG. 3 above, showing additional details of generating the customer-specific information derived from the customer information collected at step 306 of FIG. 3. At step 402, the customer's purchase history is retrieved from a central database. This retrieved history may include various categories browsed in the past, previews or excerpts read, and responses to surveys. The customer history stored in the database may be derived either from past transactions conducted at a station, or may include activities performed with a portable reader such as the reading of excerpts or the completion of surveys on the reader. Whenever a reader or smart card is presented, this stored information may be uploaded to the central server, making it available for retrieval. At step 404, advertising content for integration into the menu is retrieved. Next, at step 406, the purchase history and advertising content information is processed to generate Java code forming a Java applet. At step 408, the customer information stored in the contact device is retrieved. This information may include currently existing content, or a customer history file showing currently existing and previously existing but discarded content. Other available information may include customer preference information such as menu appearance and content. The customer information stored in the contact device is used as input to the Java applet. The Java applet thus produced is suitable for integration with other items to form a menu or other display.

Figure 5:
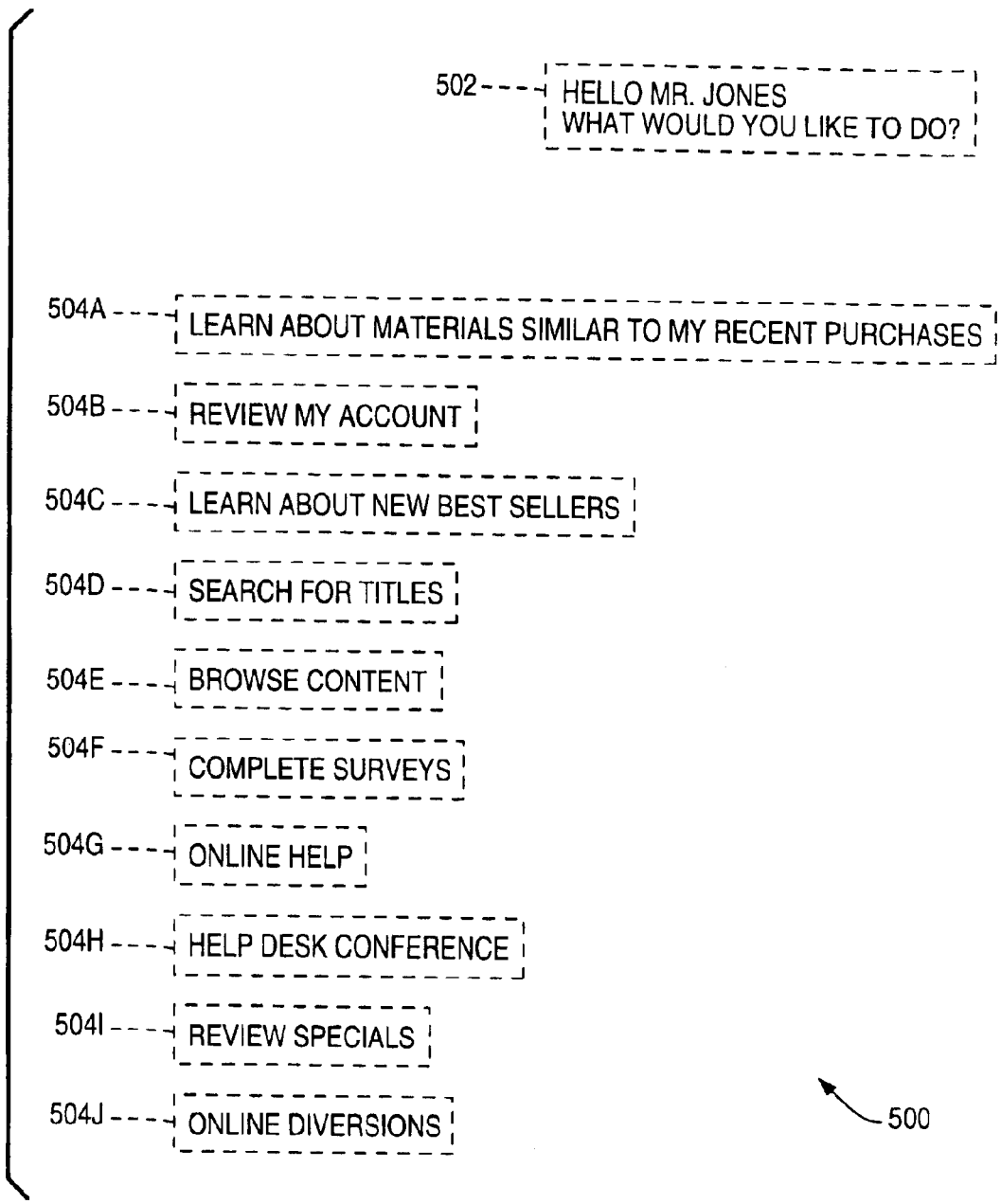
FIG. 5 illustrates an exemplary introductory menu suitably displayed by an electronic distribution station according to the present invention.

FIG. 5 illustrates an exemplary introduction screen 500 incorporating retrieved customer information. The introduction screen 500 includes a personal greeting 502 and a list of available menu selections, in this case the selections 504A–504J. When a customer chooses one of the selections 504A–504J, a subsequent menu is displayed. The specific menu which is displayed depends on the selection made.

Figure 6:
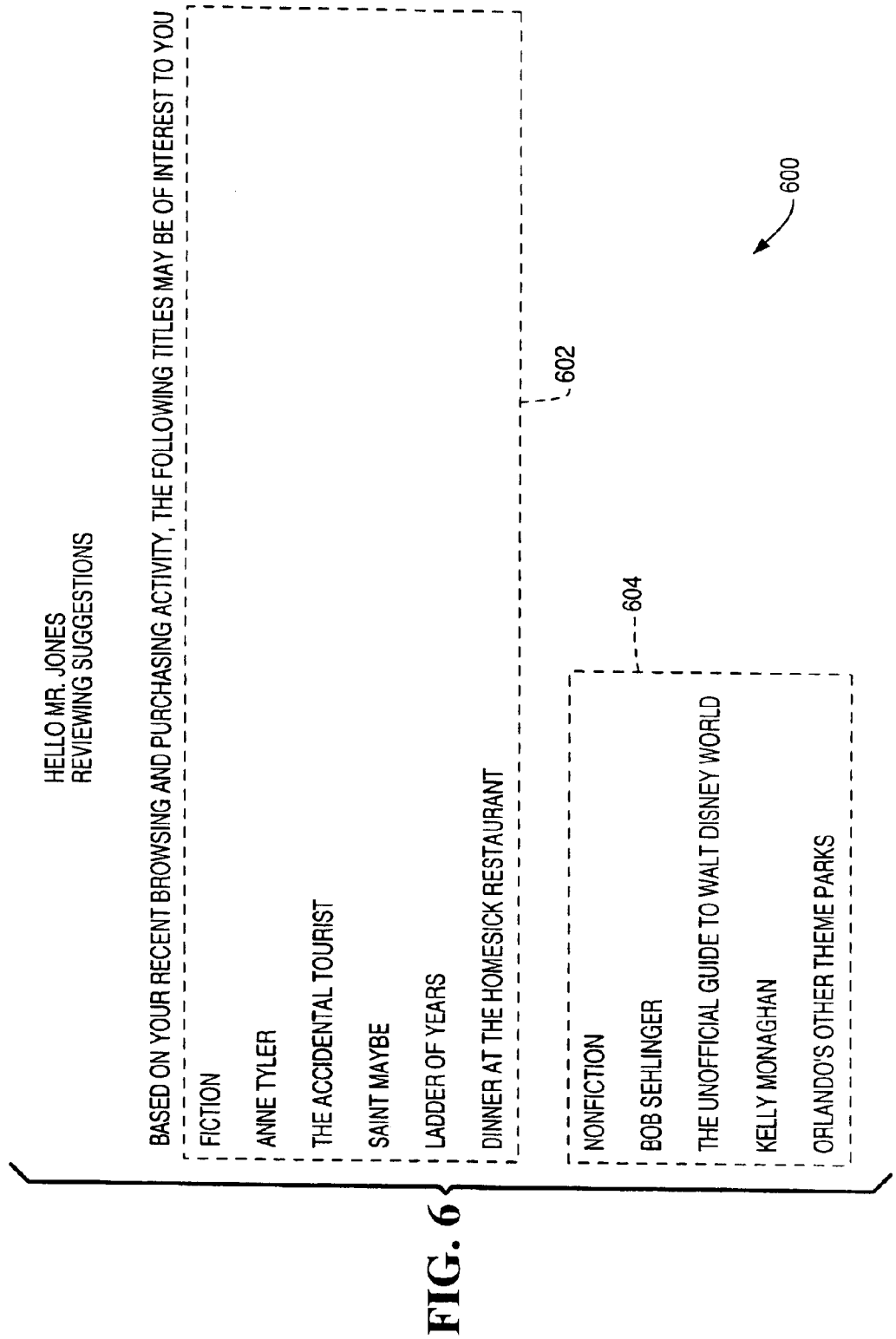
FIG. 6 illustrates a menu displayed in response to a selection from the introductory menu of FIG. 5.

FIG. 6 illustrates a suggestions menu 600 presented after the customer has chosen a selection such as the selection 504A of FIG. 5, indicating a desire to receive suggestions based on previous purchases. The suggestions menu 600 includes title suggestions developed from stored customer information indicating the customer's preferences and desires. The selections include fiction selections 602, with various titles by Anne Tyler being presented based on the customer's previous activity. The selections also include nonfiction selections 604, with various guides to travel destinations in Florida presented as selections. Upon selection of a title, the customer will be presented with a subsequent display and given further information about the title, along with an opportunity to purchase the title or, alternatively, to select a previous or different menu.

FIG. 7 illustrates a search menu 700 generated in response to the selection of item 504D of FIG. 5. The customer makes entries in one or more of the search fields 702A–702D and submits the search. A search is then conducted of the database to identify titles matching the entries which have been made, and identified titles are displayed. The fields 702A–702D are presented here as examples, but it will be recognized that numerous other fields may be employed for searching.

Figure 8:
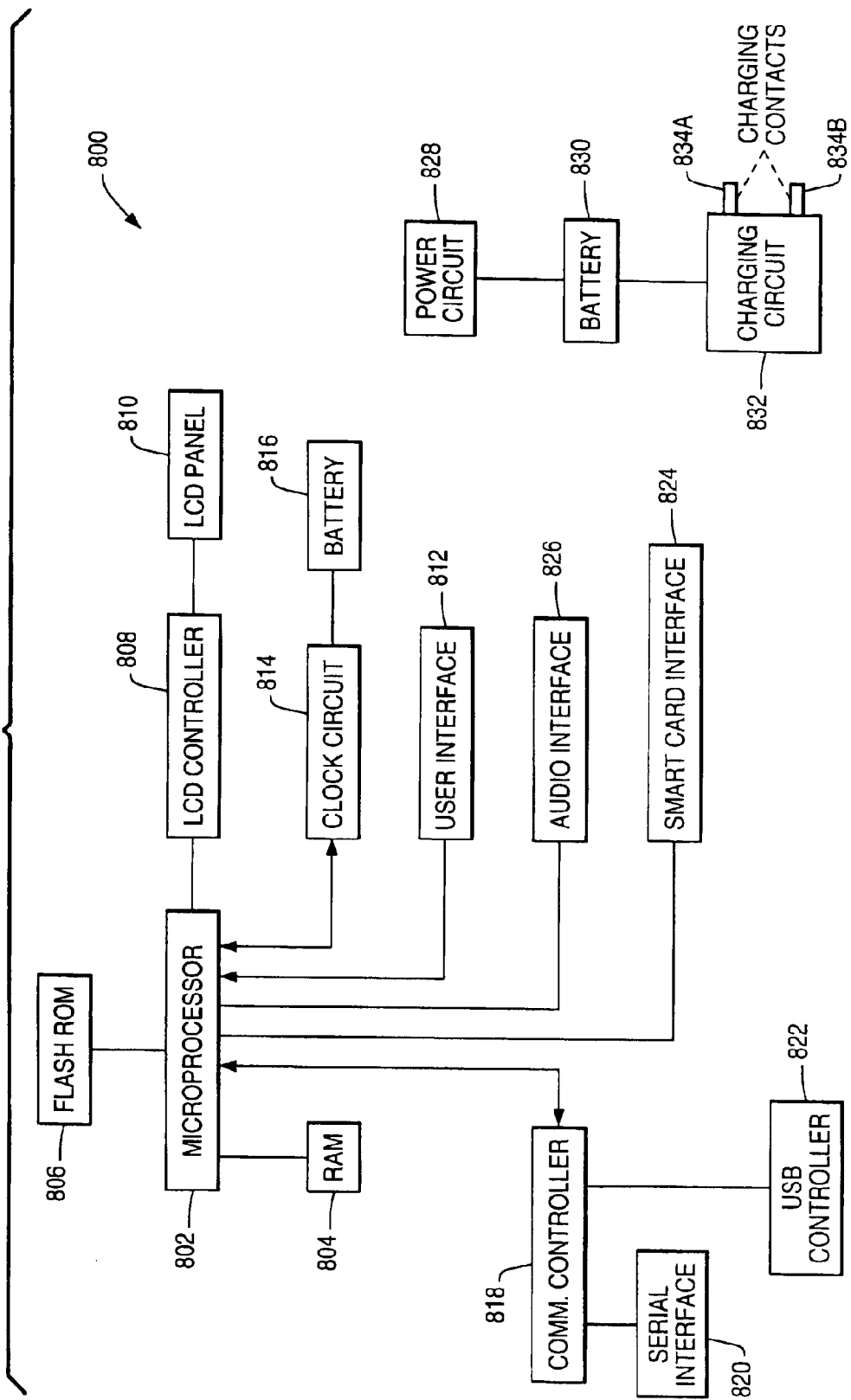
FIG. 8 illustrates an electronic information reader for use with a distribution system according to the present invention.

FIG. 8 illustrates a portable reader 800 suitable for use in a system according to the present invention. The reader 800 includes a microprocessor 802 which is connected to a RAM 804 and a flash ROM 806. The microprocessor 802 communicates with a liquid crystal display (LCD) controller 808. The LCD controller 808 may suitably be integrated into the microprocessor 802. The LCD controller 808 controls an LCD panel 810. The microprocessor 802 is connected to a user interface 812 and a clock circuit 814 which receives power from a clock battery 816. The microprocessor 802 is also connected to a communications controller 818 which manages communication between the reader 800 and a station such as the station 100 of FIG. 1. The communications controller 818 is connected to a serial interface 820, which provides RS-232 or infrared communication as desired. The communications controller 818 is also connected to a universal serial bus (USB) controller 822. The microprocessor 802 is also connected to a smart card interface circuit 824, which allows information transfer between the reader 800 and a smart card.

The reader 800 also includes a power circuit 828 for supplying appropriate voltages to the various components. The power circuit 828 receives power from a battery 830 which is connected to a battery charging circuit 832. The battery charging circuit 832 includes charging contacts 834A and 834B for connection to external power.

Figure 9:
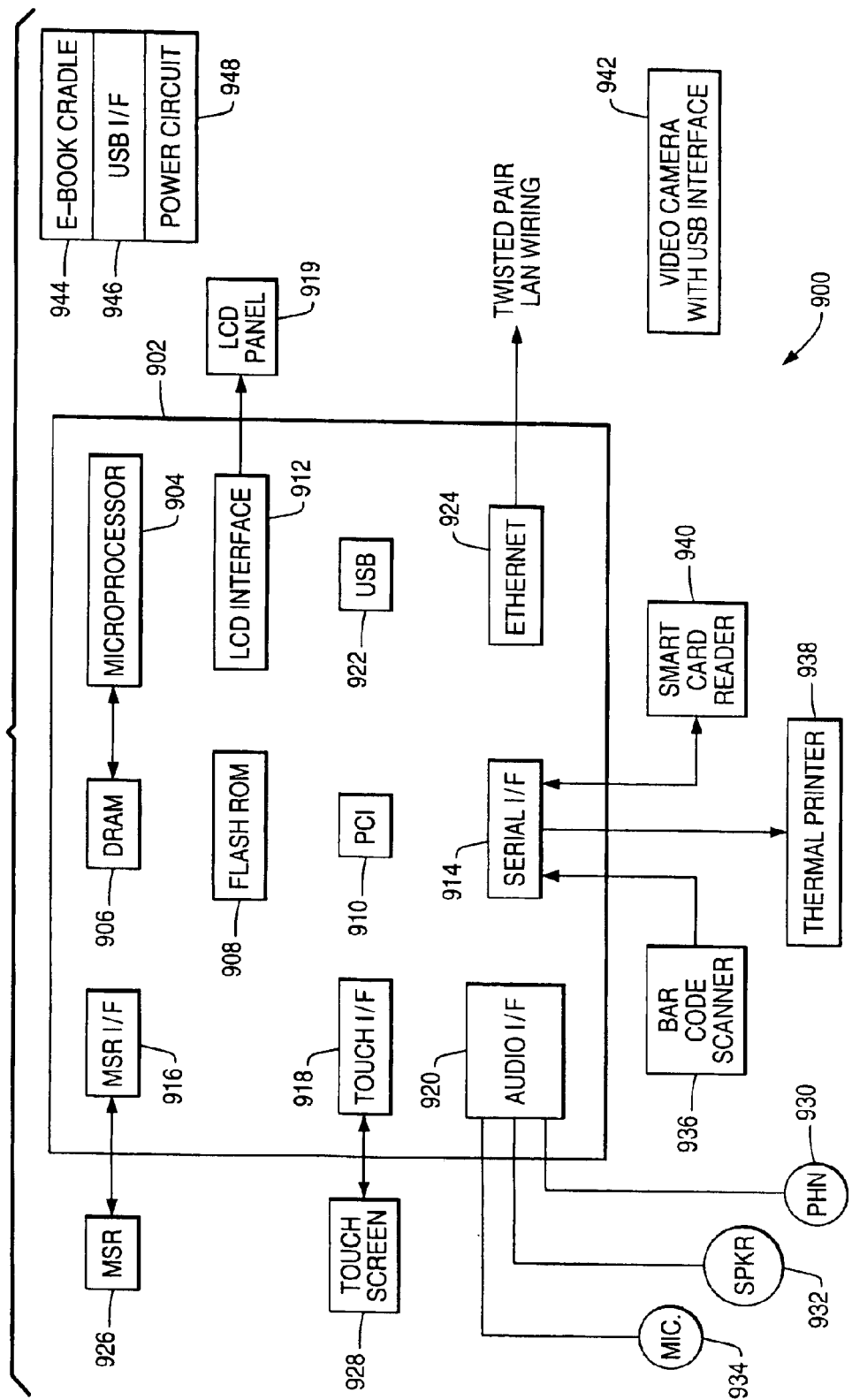
FIG. 9 illustrates additional details of an electronic distribution system according to the present invention.

FIG. 9 illustrates in greater detail the internal components of a point of sale station 900 suitable for use as the station 100 of FIG. 1. The station 900 includes a motherboard 902. The motherboard 902 includes a processor 904, such as an Intel PENTIUM® or other suitable processor. Other electronics residing on the motherboard 902 include memory 906 which may suitably be DRAM memory, flash ROM 908, a PC Interface (PCI) bus 910, an LCD interface 912, a serial interface 914, a magnetic card reader interface 916, a touchscreen interface 918, an audio interface 920, a universal serial bus 922 and an ethernet connection 924. The station 900 also includes a magnetic card reader 926 communicating with the magnetic card reader interface 916, a touch-sensitive screen 928 communicating with the touchscreen interface 918, an LCD panel 919 connected to and receiving signals from the LCD interface 912, and a microphone 930, speakers 932 and headphones 934, all communicating with the audio interface 920. The terminal 900 also includes a barcode scanner 936, thermal printer 938 and smart card reader 940, all communicating with the serial interface 914.

Communicating with the motherboard 902 via the USB 922 are a video camera 942 and an electronic book cradle 944. The electronic book cradle 944 includes a USB interface 946 for communication with the motherboard 902. The cradle 944 also includes a power circuit 948 used to provide power to a reader when the reader is placed in the cradle 944. The power circuit 948 communicates with the motherboard 902 and applies power to a reader only upon receiving a command from the motherboard 902.

Figure 10:
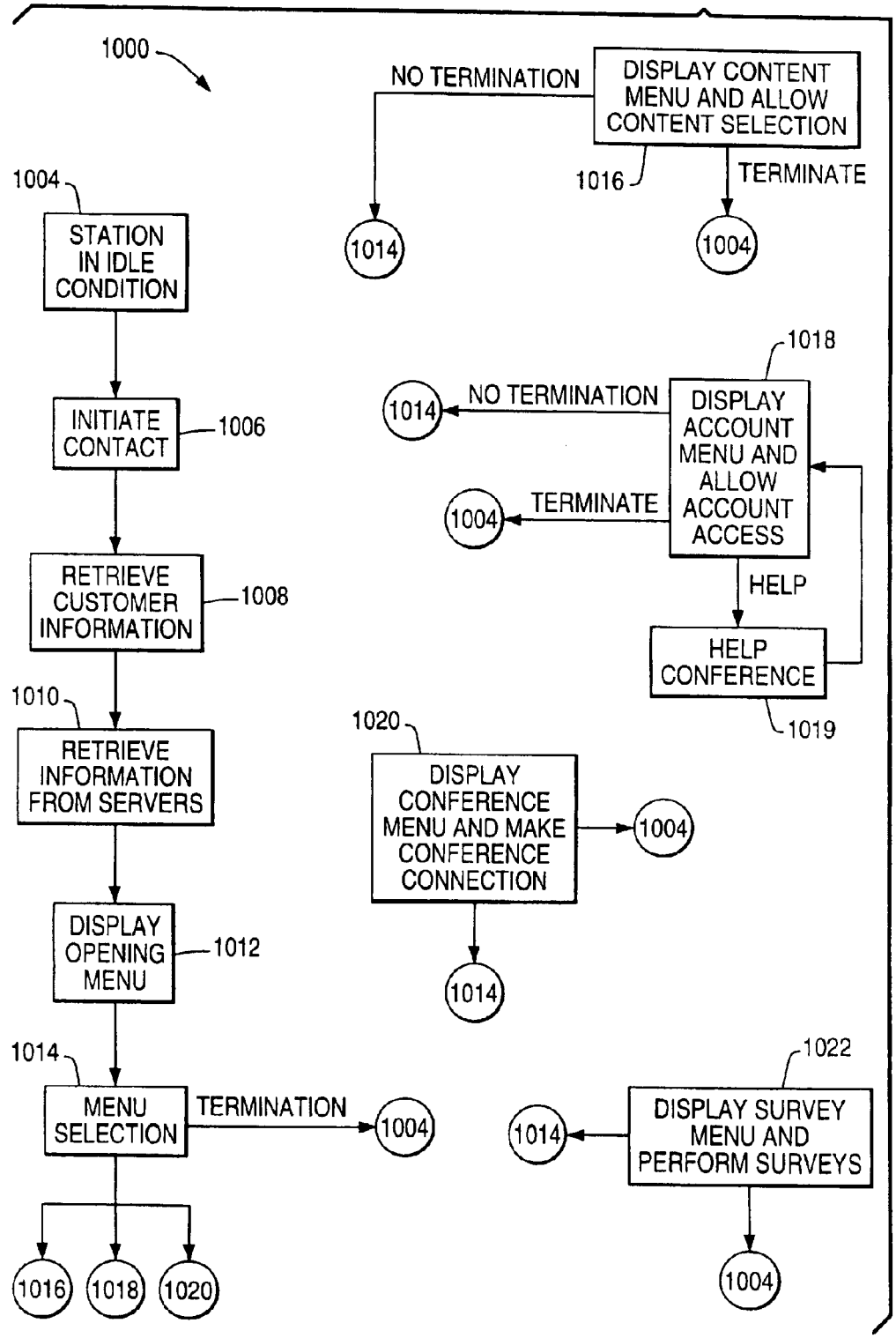
FIG. 10 illustrates a method of electronic information distribution according to the present invention.

FIG. 10 illustrates a method 1000 of electronic book distribution according to the present invention. Before the process begins, a customer approaches a distribution station such as the station 100 of FIG. 1, which may advantageously operate as part of a distribution system such as the distribution system of FIG. 2. The distribution system may advantageously include a plurality of self-service stations and terminal servers, advertising servers, content servers and other connecting infrastructure necessary to provide content and gather information needed to conduct transactions. At step 1004, the station operates in an active idle condition, receiving needed information from servers and awaiting customer input. At step 1006, contact is initiated in response to placement by the customer of a reader, smart card, or other contact device in the station. Next, at step 1008, the station retrieves customer identification and other information from the contact device. At step 1010, the station retrieves appropriate information from one or more servers. The information retrieved may be stored customer information, available title information, or other information describing specials, promotions, or other information to be used in communicating with the customer. Retrieved information may include the customer's stored purchase history, either at the individual site or station, or throughout the system. Other information may include the customer's browsing history, the presently existing content in the reader or other contact device, or the customer's previous downloading history. Next, at step 1012, the station displays an opening menu incorporating the retrieved information. Available menu selections may include skipping to immediate content selection, viewing or editing account information, audio/video conferencing, viewing of promotions, or surveys. At step 1014, a customer menu selection is detected and interpreted. If the customer has selected termination of the session, the process terminates at step 1004. If the customer has chosen an option other than termination, the process proceeds according to the selection made.

If the customer chooses content selection, the process proceeds to step 1016 and a list of content categories is displayed, including bestsellers, new titles, staff selections, titles with favorable press reviews, and titles receiving a high score in surveys among electronic book users. Additional choices are presented such as searching by desired fields such as title, subject or author, or browsing by desired fields, such as alphabetical author or subject. The operation proceeds in accordance with subsequent selections and data inputs, with subsequent menus being generated and displayed as appropriate, and with titles being retrieved from a remote server and downloaded to the contact device when a selection is made. Once a selection is made, or once a customer selects a return to the opening menu, the process returns to step 1014 and the customer makes another menu selection. Alternatively, the customer may choose to terminate the session, at which point the process returns to step 1004.

If the customer chooses to review account information, the process proceeds to step 1018 and an appropriate menu is selected and displayed, with possible selections including establishment of an account, review of financial and download credit associated with the account, generation and printing of lists of available titles, purchase of subscription or package plans and linking to a help desk for conference with support personnel. If linking to the help desk is selected, the process proceeds to step 1019 and an audio/video conference is established with a help desk. When the conference is complete, the process returns to step 1018.

Account establishment may be accomplished by reading a device identification and accepting information from the customer, then associating the customer information with the device identification. The customer account is thus associated with the device identification, and the customer account information can be retrieved whenever the device is submitted for reading, without a need to ask the user to put in the information. Questions submitted to the customer during creation of the account may include a survey for the establishment of a customer profile or preference list. Once account review is complete, the process returns to step 1014 and the opening menu is displayed or, alternatively, if the customer has chosen to terminate the session, the session terminates at step 1004.

If an audio/video conference has been selected, the process proceeds to step 1020 and an audio/video conference menu is generated and displayed, with options suitably including connection to a help desk, connection with one or more users in a chat room, and connection to a general chat or broadcast program, such as a multiple user chat or a broadcast interview with an author. Suitable connections are made depending on the option chosen. Once conferencing is complete, the process returns to step 1014 and the opening menu is displayed or, alternatively, if the customer has chosen to terminate the session, the session terminates at step 1004.

If a survey has been selected, the process proceeds to step 1022 and a menu of available surveys is generated and displayed, along with choices of how the survey is to be completed. The survey may be completed while the customer is engaged in the session at the terminal, or alternatively the survey may be downloaded to the contact device and completed by the customer at leisure, with the results being uploaded to the terminal at a subsequent session. Various incentives may be provided to induce the customer to select and complete surveys, such as credits or free books or articles. One suitable method of presenting free material would be in a serial fashion, with new material in the series being made available as each of a series of surveys is completed.

Figure 11:
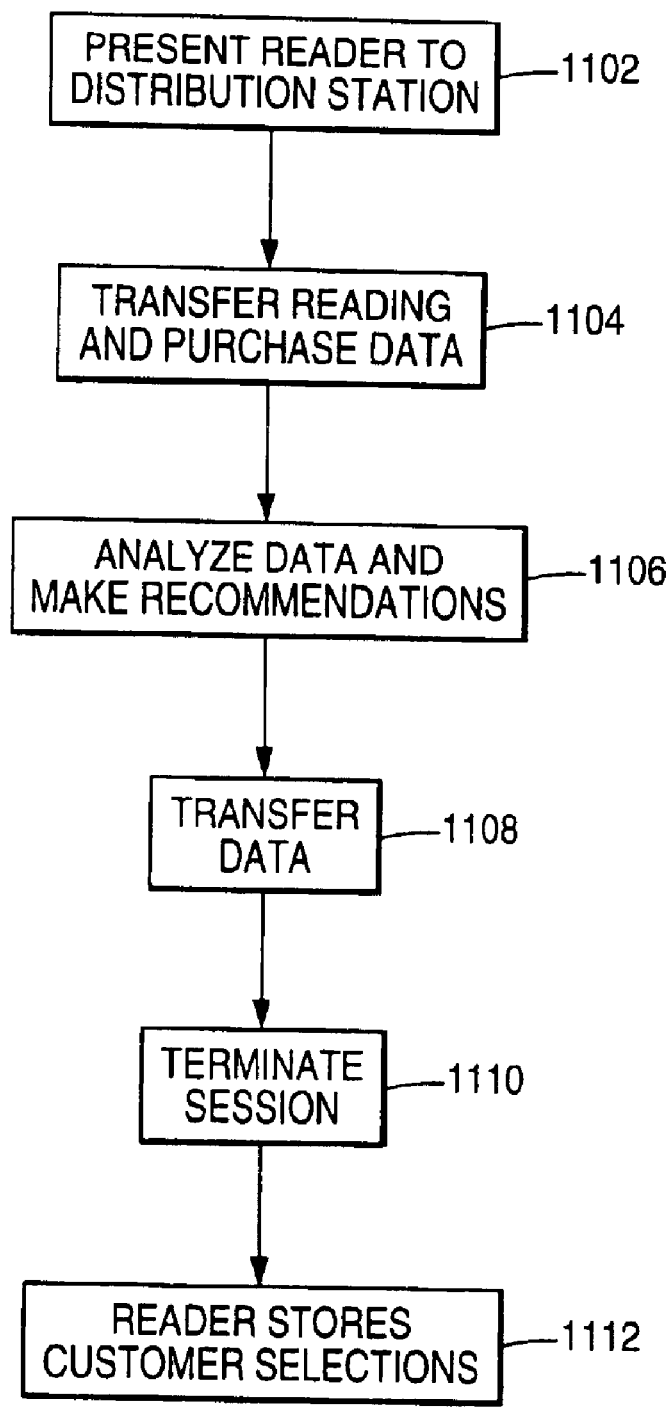
FIG. 11 illustrates a method of purchase and usage analysis according to the present invention.

FIG. 11 illustrates the steps of a method 1100 of electronic material presentation and usage analysis according to the present invention. Presentation and usage is suitably accomplished by electronic transfer of material to an electronic reader such as the reader 800 of FIG. 8, from a distribution station, such as the distribution station 100 of FIG. 1. At step 1102, a reader is presented to a distribution station for selection and transfer of material. Next, at step 1104, the reader transfers reading and purchase data to the distribution station. Next, at step 1106, the distribution station performs analysis of the reading and purchase data makes recommendations and promotional offers based on the reading and purchase data. At step 1108, station the reader and distribution station communicate and make transfers based on customer selections and commands. At step 1110, in response to removal of the reader from the distribution station, the session is terminated. At step 1112, the reader is employed to present and display the material. As the customer makes selections and choices of material, the reader stores the choices the customer has made.

While the present invention is disclosed in the context of a presently preferred embodiment, it will be recognized that a wide variety of implementations may be employed by persons of ordinary skill in the art consistent with the above discussion and the claims which follow below.

I claim:

1. A self-service terminal for allowing customer download of electronic media comprising:

a customer information interface for receiving customer information from a portable customer contact device and a central repository, said customer information including download history and usage patterns, said usage patterns including actual usage patterns of electronic media previously downloaded to the portable customer contact device;

a customer input interface including a display for communicating information to a customer describing available options and recommendations, the customer input interface allowing input from a customer, the customer input interface allowing a customer to select electronic media for purchase;

a data acquisition interface for acquiring customer selected electronic media for transfer to the portable customer contact device;

a data transfer interface for transferring customer selected electronic media to the portable customer contact device; and a processor for receiving the customer information, including the actual usage patterns of electronic media previously downloaded to the portable customer contact device, analyzing the actual usage patterns to determine customer preferences, generating tailored customer information displays based on said determined customer preferences, generating tailored customer selectable electronic media recommendations based on the received actual usage of electronic media previously downloaded to the portable customer contact device, receiving customer selections and processing financial transactions and data transfers based on the customer selections.

2. The terminal of claim 1 wherein the data transfer interface includes a download cradle adapted to connect with an electronic book reader to provide a connection for the transfer of information between the terminal and the electronic book reader.

3. The terminal of claim 2 wherein the download cradle is adapted to read customer information from the electronic book reader and wherein the customer information interface includes the download cradle.

4. The terminal of claim 1 wherein the customer information interface further includes a smart card reading and writing device for reading customer information from and writing data to a smart card; and wherein the data transfer interface also includes the smart card reading and writing device, the smart card reading and writing device being adapted to receive data from and transfer data to the terminal.

5. The terminal of claim 4 wherein the processor is adapted to retrieve the customer information and to use the customer preferences to develop purchase suggestions based on the customer preferences.

6. The terminal of claim 5 wherein the terminal is operative to cryptoprocess data for delivery to the electronic book reader.

7. The terminal of claim 6 wherein the data transfer interface includes a compact disk recorder for recording software on a recordable compact disk.

8. The terminal of claim 1 further comprising:

a loudspeaker; and wherein the customer input interface further comprises a microphone for conferencing the customer with a remote help desk operator.

9. The terminal of claim 8 wherein the customer input interface further comprises a camera for capturing video information of the customer, the data transfer interface transmitting the video information to the remote help desk operator to create a video conference.

10. The terminal of claim 1 wherein the electronic media comprises an electronic book.

11. A system for distribution of electronic media comprising:

means for arousing a self service terminal from an idle state upon presentation of a portable customer contact device;

means for retrieving customer information from a central repository and the contact device, the retrieved customer information including download history and usage patterns, said usage patterns including actual usage patterns of electronic media previously downloaded to the portable customer contact device;

means for analyzing the actual usage patterns to determine customer preferences;

means for generating tailored customer information displays based on said determined customer preferences;

means for generating customer tailored selectable electronic media recommendations based on the received actual usage of electronic media previously downloaded to the portable contact device;

means for displaying customer tailored selectable electronic media recommendations on the self service terminal;

means for selecting electronic media for purchase;

means for receiving the customer selections; and means for processing financial transactions and data transfers based on the customer selections.

12. The system of claim 11 wherein the means for processing financial transactions and data transfers further comprises a means for cryptoprocessing media for delivery to the contact devices.

13. The system of claim 11 further comprising:

an advertising server;

wherein the means for retrieving customer information further comprises a means of retrieving advertising from the advertising server and a means of supplying the advertising to the self service terminal.

14. The system of claim 13 wherein the self service terminal selectively displays advertising based on customer information and customer contact information.

15. The system of claim 11 wherein the self service terminal connects to a network adapted to provide remote audio and video communication.

16. A method of electronic media distribution, comprising the steps of:

arousing a self service terminal from an idle state upon presentation of a portable customer contact device;

retrieving customer information from a central repository and the contact device, the retrieved customer information including download history and usage patterns, said usage patterns including actual usage patterns of electronic media previously downloaded to the portable customer contact device;

analyzing the actual usage patterns to determine customer preferences;

generating tailored customer information displays based on said determined customer preferences;

generating customer tailored selectable electronic media recommendations based on the received actual usage of electronic media previously downloaded to the portable contact device;

displaying customer tailored selectable electronic media recommendations on the self service terminal;

selecting electronic media for purchase;

receiving the customer selections; and processing financial transactions and data transfers based on the customer selections.

17. The method of claim 16 wherein the step of retrieving the customer information is followed by a further step of retrieving advertising content and wherein the advertising content and the centrally stored customer information are processed to generate a java applet, and wherein the step of generating customer tailored selectable electronic media recommendations includes providing the locally stored customer information to the java applet as an input.

* * * * *